United States Patent
Sun et al.

(10) Patent No.: US 11,356,302 B1
(45) Date of Patent: Jun. 7, 2022

(54) EQUALIZER TRAINING DURING LINK SPEED NEGOTIATION

(71) Applicant: Credo Technology Group Limited, Grand Cayman (KY)

(72) Inventors: Junqing Sun, Fremont, CA (US); Haoli Qian, Fremont, CA (US)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 17/107,886

(22) Filed: Nov. 30, 2020

(51) Int. Cl.
*H04L 25/03* (2006.01)
*H04B 1/12* (2006.01)

(52) U.S. Cl.
CPC ............... *H04L 25/03* (2013.01); *H04B 1/12* (2013.01)

(58) Field of Classification Search
CPC .................................. H04L 25/03; H04B 1/12
See application file for complete search history.

(56) References Cited

U.S. PATENT DOCUMENTS

| | | | | |
|---|---|---|---|---|
| 5,018,166 A * | 5/1991 | Tjahjadi | ................. | H04L 7/0058 375/232 |
| 6,760,371 B1 * | 7/2004 | Bach | ................. | H04L 25/03038 375/231 |
| 8,488,729 B1 | 7/2013 | Mendel et al. | | |
| 8,832,511 B2 | 9/2014 | Chen et al. | | |
| 9,106,570 B2 | 8/2015 | Masood et al. | | |
| 2001/0021987 A1 | 9/2001 | Govindarajan et al. | | |
| 2001/0031022 A1 * | 10/2001 | Petrus | ....................... | H04L 1/06 375/324 |
| 2007/0237464 A1 * | 10/2007 | Aronson | .............. | G02B 6/4416 385/89 |
| 2009/0086753 A1 | 4/2009 | Lund et al. | | |

(Continued)

FOREIGN PATENT DOCUMENTS

| CN | 1770660 A | 5/2006 |
|---|---|---|
| CN | 106411322 A | 2/2017 |

(Continued)

OTHER PUBLICATIONS

INCITS 545-20xx Rev 1.0 "Fibre Channel Framing and Signaling—5 (FC-FS-5) Rev 1.0". Apr. 3, 2018.

(Continued)

*Primary Examiner* — Dac V Ha
(74) *Attorney, Agent, or Firm* — Ramey LLP; Daniel J. Krueger

(57) ABSTRACT

An illustrative digital communications method includes: filtering a receive signal to provide a filtered receive signal; deriving symbol decisions from the filtered receive signal; detecting a baud rate of the receive signal; adapting one or more coefficients of the filter if the baud rate is above a predetermined rate; and inhibiting coefficient adaptation if the baud rate is below the predetermined rate. The method may be implemented in a receiver having: a filter to convert a receive signal into a filtered receive signal; a decision element coupled to the filter to derive symbol decisions; a baud rate detector to detect a baud rate of the receive signal; and an adaptation module to adapt one or more coefficients of the filter if the baud rate is above a predetermined rate, the baud rate detector inhibiting adaptation if the baud rate is below the predetermined rate.

22 Claims, 3 Drawing Sheets

(56) References Cited

U.S. PATENT DOCUMENTS

| | | |
|---|---|---|
| 2009/0304054 A1* | 12/2009 | Tonietto ............ H04L 25/03343 |
| | | 375/221 |
| 2009/0319838 A1 | 12/2009 | Jones, Jr. |
| 2010/0329325 A1 | 12/2010 | Mobin et al. |
| 2013/0209089 A1* | 8/2013 | Harley ................ H04B 10/5561 |
| | | 398/25 |
| 2013/0343400 A1 | 12/2013 | Lusted et al. |
| 2014/0086264 A1 | 3/2014 | Lusted et al. |
| 2014/0146833 A1 | 5/2014 | Lusted et al. |
| 2015/0003505 A1 | 1/2015 | Lusted et al. |
| 2016/0037486 A1 | 2/2016 | Wentzloff et al. |
| 2016/0080101 A1 | 3/2016 | Naeini et al. |
| 2016/0134394 A1 | 5/2016 | Tiruvur et al. |
| 2016/0323164 A1 | 11/2016 | Cao |
| 2016/0337114 A1 | 11/2016 | Baden et al. |
| 2016/0337183 A1 | 11/2016 | Cornett et al. |
| 2017/0324657 A1 | 11/2017 | Zhong |
| 2018/0041332 A1 | 2/2018 | Yang |

FOREIGN PATENT DOCUMENTS

| | | |
|---|---|---|
| CN | 108737024 A | 11/2018 |
| CN | 109075992 A | 12/2018 |
| CN | 109286416 A | 1/2019 |

OTHER PUBLICATIONS

Laskin, Ekaterina. On-Chip Self-Test Circuit Blocks for High-Speed Applications. 2006. University of Toronto, Masters Thesis.

PCT International Search Report and Written Opinion, dated Dec. 6, 2017, Appl. No. "Ethernet Link Extension Method and Device," filed Mar. 8, 2017, 12 pages.

Chinese Office Action dated Jan. 15, 2020 for Application No. 201810796112.0.

Chinese Notice of First Office Action dated Aug. 27, 2020 for CN Application No. 201810333105.7.

Supplemental Notice of Allowability, dated Jan. 14, 2019, U.S. Appl. No. 15/654,446, "Serdes Architecture With a Hidden Backchannel Protocol," filed Jul. 19, 2017, 8 pages.

PCT International Search Report and Written Opinion, dated Sep. 28, 2018, Appl. No. PCT/US2018/013361, "Serdes Systems and Methods Having an Indirect Backchannel," filed Jan. 11, 2018, 18 pages.

* cited by examiner

EQUALIZER TRAINING DURING LINK SPEED NEGOTIATION

BACKGROUND

Various standards have been developed to support the need for ever-faster transport of ever-larger data volumes between devices. Fibre Channel is one such standard established by the International Committee for Information Technology Standards (INCITS) for use in storage area networks (SAN), offering data transfer rates that have approximately doubled every three years since 1993. One consequence of this evolution is that the various devices in a given network may be employing multiple generations of the standard. To enable gradual upgrades of network hardware, the Fibre Channel standard suggests that each device should provide backward compatibility with at least two previous generations of the standard, and specifies mechanics of a Link Speed Negotiation method that may be employed by linked devices to determine the highest speed supported by both devices on that link.

Link Speed Negotiation involves, among other things, sending training signals at progressively lower speeds until the receiver determines that the signal can satisfactorily received and notifies the transmitter accordingly. For its part, the receiver iterates through its supported speeds, testing to see whether any of them match the currently transmitted training signal. The results of attempting such negotiation using a receiver with an adaptive equalizer have not been previously addressed.

SUMMARY

Accordingly, there are disclosed herein a communications method, a receiver, and a data recovery and remodulation device, each providing improved equalization training during link speed negotiation. One illustrative example of a digital communications method includes: filtering a receive signal to provide a filtered receive signal; deriving symbol decisions from the filtered receive signal; detecting a baud rate of the receive signal; adapting one or more coefficients of the filter if the baud rate is above a predetermined rate; and inhibiting coefficient adaptation if the baud rate is below the predetermined rate.

An illustrative example of a receiver includes: a filter to convert a receive signal into a filtered receive signal; a decision element coupled to the filter to derive symbol decisions; a baud rate detector to detect a baud rate of the receive signal; and an adaptation module to adapt one or more coefficients of the filter if the baud rate is above a predetermined rate, the baud rate detector inhibiting adaptation if the baud rate is below the predetermined rate.

An illustrative example of a data recovery and remodulation device includes: a receiver to recover a data stream from a receive signal; and a transmitter coupled to the receiver to retransmit the data stream. The receiver includes: an adaptive equalizer that converts the receive signal into an equalized signal; a decision element that derives symbol decisions from the equalized signal; a baud rate detector that detects a baud rate of the receive signal and inhibits adaptation of the adaptive equalizer while the baud rate is below a predetermined rate.

Each of the foregoing examples may be implemented individually or conjointly, and may be implemented with one or more of the following features in any suitable combination: 1. digitizing the receive signal. 2. periodically calculating a frequency transform coefficient corresponding to the predetermined rate; and determining whether a magnitude of the frequency transform coefficient exceeds a predetermined magnitude. 3. the detecting includes: periodically capturing a sequence of symbol decisions; and determining whether the sequence includes any patterns of alternating symbols. 4. the detecting includes continuously monitoring the symbol decisions for sequences of alternating symbols. 5. the detecting is performed during a Link Speed Negotiation stage of a Fibre Channel initiation process. 6. using a timing loop to match a symbol clock signal to the receive signal, the timing loop enabling frequency tracking and phase tracking; and inhibiting frequency tracking if the baud rate is below the predetermined rate. 7. a symbol clock signal generator that generates a symbol clock at a highest supported baud rate regardless of the detected baud rate. 8. using the symbol clock signal to retransmit the data stream.

DETAILED DESCRIPTION

Figure 1:
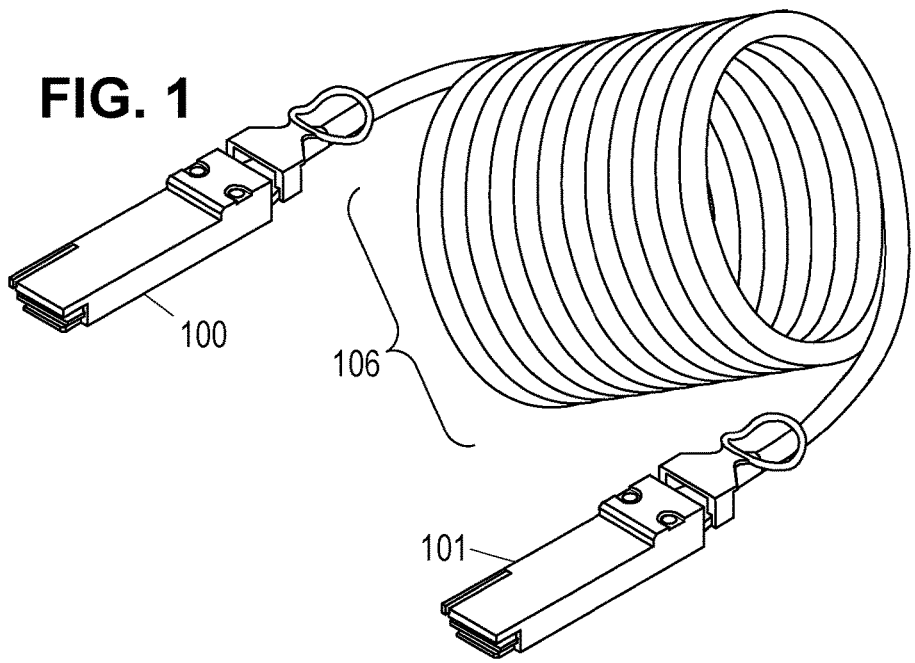
FIG. 1 is a perspective view of an illustrative Fibre Channel cable.

While specific embodiments are provided in the drawings and the following description, keep in mind that they do not limit the disclosure. On the contrary, they provide the foundation for one of ordinary skill to discern the alternative forms, equivalents, and modifications that are encompassed in the scope of the appended claims.

FIG. 1 is a perspective view of an illustrative Fibre Channel cable that may be used to provide a high-bandwidth communications link between devices in a routing network. The routing network may be or include, for example, the Internet, a wide area network, a storage area network, or a local area network. The linked devices may be computers, switches, routers, storage systems, and the like.

The cable includes a first connector 100 and a second connector 101 that are connected via optical fibers in a cord 106. The connectors 100, 101 are pluggable modules (e.g., small form-factor pluggable "SFP", double-density SFP "SFP-DD", or quad SFP "QSFP") that connect to matching ports in the host devices to exchange electrical signals with the hosts. The connectors 100, 101 each include integrated circuitry to convert between the host-side electrical signals and cable-side optical signals for conveyance over optical fibers in cord 106.

For better performance, the contemplated integrated circuitry implements not just conversion between electrical and optical signals, but also data recovery and remodulation (DRR). The DRR devices may include adaptive equalizers that accommodate variations in the channel and communication electronics to maximize signal margin, enable higher data rates, and improve long term reliability.

The DRR devices each process data streams traveling in each direction. Notably, the transceivers perform data recovery and remodulation not only of the inbound data streams to the host interface as they exit the cable, but also of the outbound data streams from the host interface as they enter the cable.

Figure 2:
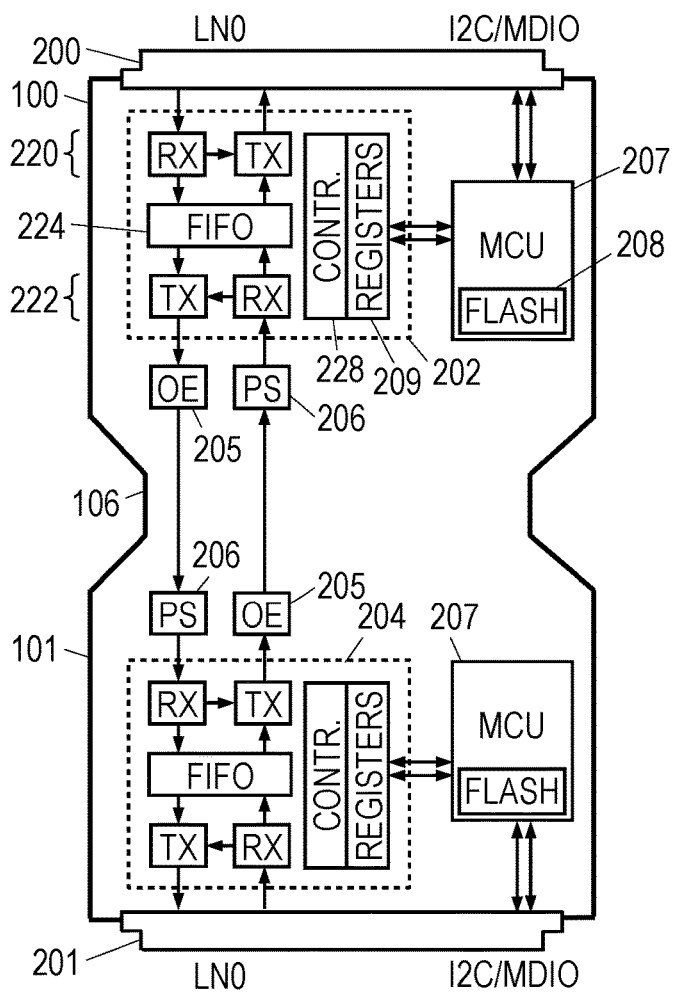
FIG. 2 is a function-block diagram of the illustrative cable.

FIG. 2 is a function-block diagram of the illustrative cable of FIG. 1. Connector 100 includes a plug 200 having electrical contacts that mate with the contacts of a standard-compliant Fibre Channel port to exchange digital communication signals with a first host device. Similarly, connector 101 includes a plug 201 having electrical contacts that mate with the contacts of a Fiber Channel port to exchange digital communication signals with a second host device. Connector 100 includes a first DRR device 202 to perform data recovery and remodulation of the data streams entering and exiting the cable at connector 100, and connector 101 includes a second DRR device 204 to perform data recovery and remodulation of the data streams entering and exiting the cable at connector 101. The DRR devices 202, 204 may be integrated circuits mounted on a printed circuit board and connected to plug contacts via circuit board traces. The printed circuit board may further support an optical emitter 205 to convert the retransmitted signal from the DRR device into an optical signal for conveyance over an optical fiber in cord 106, and a photosensor 206 to convert the optical signal received via cord 106 into an electrical receive signal for the DRR device.

In at least some contemplated embodiments, the printed circuit boards each also support a micro-controller unit (MCU) 207 coupled to the respective DRR device 202, 204. The MCU device 207 configures the operation of the DRR device via a first two-wire bus. At power-on, the MCU device 207 loads equalization parameters from Flash memory 208 into the DRR device's configuration registers 209. The host device can access the MCU device 207 via a second two-wire bus that operates in accordance with the I2C bus protocol and/or the faster MDIO protocol. With this access to the MCU device 207, the host device can adjust the cable's operating parameters and monitor the cable's performance as discussed further below.

Each DRR device 202, 204, includes a set 220 of host-facing transmitters and receivers for communicating with the host device and a set 222 of cable-facing transmitters and receivers for sending transmit signals and receiving receive signals via the optical transducers 205, 206 and optical fibers running the length of the cable. The illustrated cable supports a single bidirectional communication lane LN0 formed by two unidirectional connections, each unidirectional connection having a dedicated optical fiber.

The DRR devices 202, 204 optionally include a memory 224 to provide first-in first-out (FIFO) buffering between the transmitter & receiver sets 220, 222. An embedded controller 228 coordinates the operation of the transmitters and receivers by, e.g., setting initial equalization parameters and ensuring that speed negotiation and link training are complete before enabling the transmitters and receiver to enter the data transfer phase. The embedded controller 228 employs a set of registers 208 to receive commands and parameter values, and to provide responses potentially including status information and performance data.

In at least some contemplated embodiments, the host-facing transmitter and receiver set 220 employ fixed equalization parameters that are cable-independent, i.e., they are not customized on a cable-by-cable basis. The cable-facing transmitter and receiver set 222 preferably employ cable-dependent equalization parameters that are customized on a cable-by-cable basis. The cable-dependent equalization parameters may be adaptive, with initial values that are determined during manufacturer tests of the cable. The equalization parameters may include filter coefficient values for pre-equalizer filters in the transmitters, and gain and filter coefficient values for the receivers.

Figure 3:
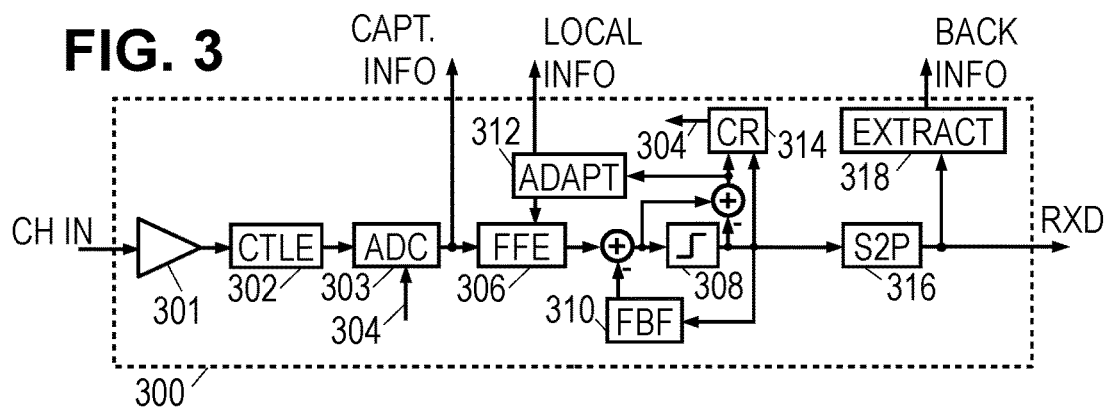
FIG. 3 is a block diagram of a receiver in an illustrative data recovery and remodulation (DRR) device.
Figure 4:
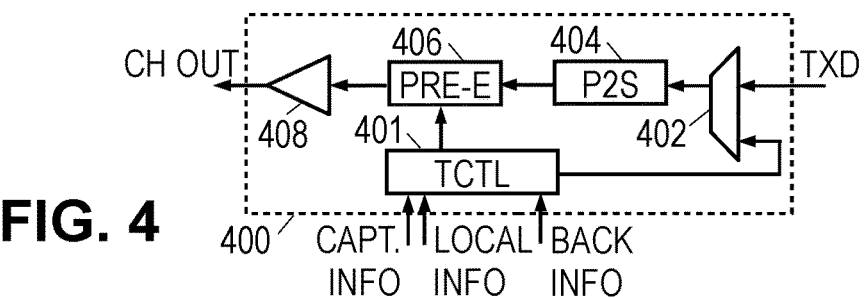
FIG. 4 is a block diagram of a transmitter in an illustrative DRR device.

FIGS. 3 and 4 are block diagrams of an illustrative receiver and an illustrative transmitter that may be members of the sets 220, 222. In FIG. 3, receiver 300 receives an analog electrical signal (CH_IN) and supplies it to an optional low noise amplifier (LNA) 301. If included, the LNA 301 provides a high input impedance to minimize channel loading and amplifies the received electrical signal to drive the input of a continuous time linear equalization (CTLE) filter 302. CTLE filter 302 provides continuous time filtering to prevent aliasing and optionally to shape the signal spectrum. An analog to digital converter (ADC) 303 samples and digitizes the receive signal in accordance with a symbol clock signal 304.

A digital feed-forward equalization (FFE) filter 306 may be used to reduce leading intersymbol interference in the digitized receive signal. The filtered receive signal is combined with a feedback signal to provide an equalized signal for a decision element 308. A feedback filter (FBF) filters symbol decisions from the decision element to produce the feedback signal, which corrects for trailing intersymbol interference in the filtered receive signal. This equalization and detection arrangement is known as decision feedback equalization (DFE), and it yields a stream of symbol decisions. Some receiver variations employ oversampling in the FFE 306 and FBF 310.

The input and output of decision element 308 may be differenced to provide an error signal for use by an adaptation module 312 and a clock recovery module 314. The adaptation module 312 uses the error signal to optimize coefficients of the FFE 306 and FBF 310. The clock recovery module 314 uses the error signal, usually in combination with the symbol decisions, to derive the symbol clock signal 304.

A serial-to-parallel circuit 316 groups the digital data stream bits or symbols into blocks to enable subsequent on-chip operations to use lower clock rates. The symbols or data blocks are placed on the digital receive bus (RXD) for remodulation and transmission by a transmitter to the remote end of the channel. The received data stream may be structured as a sequence of frames each having a header and a payload. One or more fields in the frame headers may contain backchannel information, and if so, the extraction module 318 detects those fields and extracts the backchannel information for local use. As one example, the backchannel information may include adaptation information for the pre-equalization filter used by the local transmitter.

In addition to optimizing FFE and FBF coefficients, the adaptation module 312 may further determine adjustments for the CTLE filter 302 and for the remote transmit, or "pre-equalization", filter 406. The adaptation module outputs locally-generated information (LOCAL_INFO), which includes the transmit filter coefficient adjustments and the convergence status. Where the system supports the use of a backchannel, the LOCAL_INFO is supplied to a local transmitter 400 (FIG. 4) that communicates in the reverse direction on the data lane. The local transmitter 400 communicates the transmit filter adjustments and the convergence status via the backchannel to the source of the CH_IN signal. In that vein, the received signal includes backchannel information from the source of the CH_IN signal. The extraction module 318 detects the back-channel information (BACK_INFO) and passes it to the local transmitter 400. Once convergence is achieved, receiver 400 is ready to begin normal operations.

FIG. 3 further shows a signal tap on the output of ADC 303, labeled as "CAPT. INFO". A training controller may periodically buffer and capture intervals of the digitized receive signal for baud rate detection. In other variations, the signal may be captured from other points in the receive chain, such as the filtered receive signal at the output of the FFE, the equalized signal at the input to the decision element, or the symbol decisions at the output of the decision element.

The CAPT. INFO, BACK INFO, and LOCAL INFO, are conveyed to a training controller 401, shown in FIG. 4 as part of the local transmitter 400 though it could be implemented as part of embedded controller 228. Transmitter 400 receives blocks of channel bits or symbols for transmission to the source of the CH_IN signal (FIG. 3). During normal operations, multiplexer 402 supplies blocks of channel bits or symbols from the remote source (received on the TXD bus) to the parallel to serial (P2S) circuit 404. P2S circuit 404 converts the blocks into a digital data stream. A transmit filter 406, also called a pre-equalization filter, converts the digital data stream into an analog electrical signal with spectral shaping to combat channel degradation. Driver 408 amplifies the analog electrical signal to drive the channel output (CH_OUT) node.

During the link speed negotiation and equalizer training phase, multiplexer 402 obstructs information from the TXD bus, instead supplying P2S circuit 404 with a training signal from training controller 401. The training controller 401 generates the training signal with field values based on the convergence status and transmit filter coefficient adjustments (LOCAL_INFO) received from the local receiver 300. That is, in addition to training patterns, the training frames may include backchannel information to be used by the remote end of the channel. Note that even after the local receiver indicates filter convergence has occurred, the training controller 401 may prolong the training phase to coordinate training phase timing across each link of the channel.

The training controller 401 further accepts any backchannel information (BACK_INFO) extracted by the local receiver 300 from received training frames sent by the remote node. The training controller 401 applies the corresponding adjustments to the coefficients of transmit filter 406. Upon conclusion of the training phase, multiplexer 402 begins forwarding TxD blocks to the P2S circuit 404.

Figure 5:
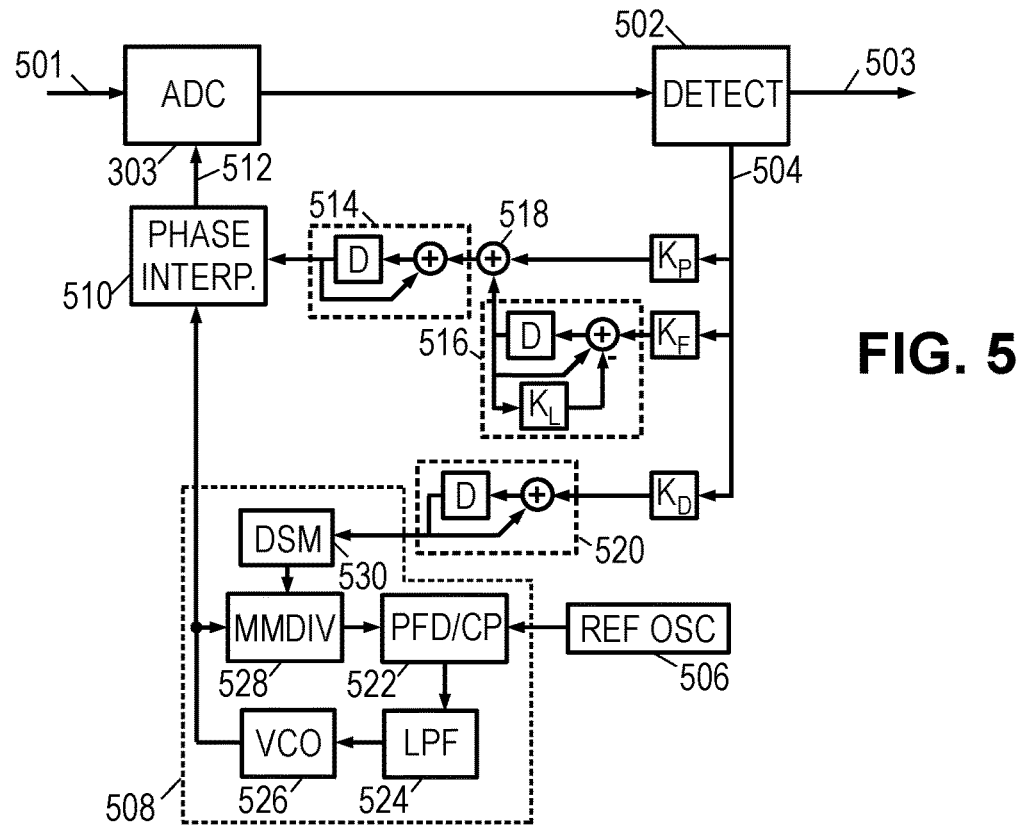
FIG. 5 is a block diagram of an illustrative timing recovery loop.

FIG. 5 shows a timing loop of an illustrative receiver represented as an analog-to-digital converter 303 and detection module 502. The ADC 303 samples the analog receive signal 501 at sample times corresponding to transitions in a symbol clock signal 512, thereby providing a digital receive signal to detection module 502. The detection module 502 derives symbol decisions from the digital receive signal, optionally employing equalization such as the above-described decision feedback equalization, sequence detection, or some other form of symbol detection. The resulting stream of symbol decisions 503 may be provided as a parallelized symbol stream for handling by "on-chip" circuitry, e.g., error correction and FIFO buffering.

The detection module 502 includes some form of a timing error estimator to generate a timing error signal 504. Any suitable design may be used for the timing error estimator including, e.g., a bang-bang or proportional phase detector. One suitable timing error estimator is set forth in co-owned U.S. Pat. No. 10,447,509, "Precompensator-based quantization for clock recovery", which is hereby incorporated herein by reference in its entirety. Other suitable timing error estimators can be found in the open literature, including, e.g., Mueller, "Timing Recovery in Digital Synchronous Data Receivers", IEEE Trans. Commun., v24n5, May 1976, and Musa, "High-speed Baud-Rate Clock Recovery", U. Toronto Thesis, 2008.

In FIG. 5, the timing error signal 504 is coupled via two feedback paths to control a phase interpolator 510 in a fashion that statistically minimizes the amplitude or energy of timing error signal 504. In the first feedback path, the timing error signal is scaled by a phase coefficient ($K_P$) and integrated by a phase error accumulator 514 to provide a phase error signal (supplied as a control signal to the phase interpolator 510). In the second feedback path, the timing error signal is scaled by a frequency coefficient ($K_F$) and integrated by a "leaky" frequency error accumulator 516 to obtain a frequency offset signal. Leaky frequency error accumulator 516 multiplies the frequency offset signal by $(1-K_L)$ in each integration cycle, where KL is the leakage coefficient causing gradual memory loss. A summer 518 adds the frequency offset signal to the scaled timing error signal, supplying the sum to the phase error accumulator 514.

The phase interpolator 510 also receives a clock signal from a phase lock loop (PLL) 508. The control signal causes the phase interpolator 510 to produce the symbol clock signal by adjusting the phase of the clock signal in a fashion that minimizes an expected value of the timing error signal 504. In other words, the control signal compensates for both the frequency offset and phase error of the clock signal relative to the analog receive signal 501, thereby phase-aligning the symbol clock signal 512 with the data symbols in the analog receive signal 501.

The clock signal produced by PLL 508 is a frequency-multiplied version of a reference clock signal from reference oscillator 506. A voltage controlled oscillator (VCO) 526 supplies the clock signal to both the phase interpolator 510 and to a multi-modulus divider 528 that divides the frequency of the clock signal by a variable modulus N. The counter supplies the divided-frequency clock signal to a phase-frequency detector (PFD) 522. PFD 522 may use a charge pump (CP) as part of determining which input (i.e., the divided-frequency clock signal or the reference clock signal) has transitions earlier or more often than the other. A low pass filter 524 filters the output of PFD 522 to provide a control voltage to VCO 526. The filter coefficients are chosen so that the divided frequency clock becomes phase aligned with the reference oscillator.

The timing error signal 504 is coupled to control the multi-modulus divider 528 via a third feedback path. The third feedback path includes a division-ratio scaling coefficient (KD) and a division-ratio error accumulator 520, which supplies a division-ratio control signal to a delta-sigma modulator (DSM) 530. DSM 530 converts the division-ratio control signal into pulses of a modulus selection signal, which selects between values of the modulus (such as N and N+1). The pulse density controls what fractional value between N and N+1 the divider 528 implements, enabling very fine control of the clock frequency supplied to the interpolator 510. The division-ratio control signal adjusts the frequency offset of the clock signal relative to the data in the analog receive signal 501, substantially reducing the phase rotation rate needed from the phase interpolator 510.

The frequency offset correction provided by leaky accumulator 516 enables the second feedback path to provide a fast response, while causing the frequency offset signal to tend toward zero over longer time scales. The division-ratio error accumulator 520, in combination with the low pass filter 524 of the phase lock loop 508, operates on a longer time scale to overcome the memory loss of the leaky accumulator 516. Under steady-state or slow-changing conditions, the frequency offset correction is provided by the third feedback path. Where conditions where the frequency offset changes more quickly, the more transient corrections are provided by the first and second feedback paths. In situations where frequency tracking is unnecessary (e.g., where the symbol clock signal provides oversampling of the receive signal), frequency tracking can be suspended by, e.g., setting the $K_D$ and optionally $K_F$ coefficients to zero.

Within the foregoing context of an illustrative implementation, we now turn to the Link Speed Negotiation phase of establishing a Fibre Channel link between, say, a host devices that comply with different generations of the Fibre Channel standard. Pursuant to the standard, Link Speed Negotiation includes the transmitter sending training signals at progressively lower speeds until the receiver determines that the signal can satisfactorily received and notifies the transmitter accordingly. For its part, the receiver iterates through its supported speeds, testing to see whether any of them match the currently transmitted training signal.

Thus, for example, a Fibre Channel port of a given host may support the "16GFC" speed in which a data stream is conveyed using non-return to zero (NRZ) signaling with a 64b66b line code and standard-compliant framing and communications protocol at a line rate of 14.025 gigabaud to provide a nominal throughput of 1600 megabytes per second. Pursuant to the standard, the host may further support the two previous generations, "10GFC" and "8GFC". 10GFC uses NRZ signaling with the 64b66b line code at a line rate of 10.51875 gigabaud to provide a nominal throughput of 1200 megabytes per second. 8GFC uses NRZ signaling with an 8b10b line code at a line rate of 8.6 gigabaud to provide a nominal throughput of 800 megabytes per second.

Figure 6:
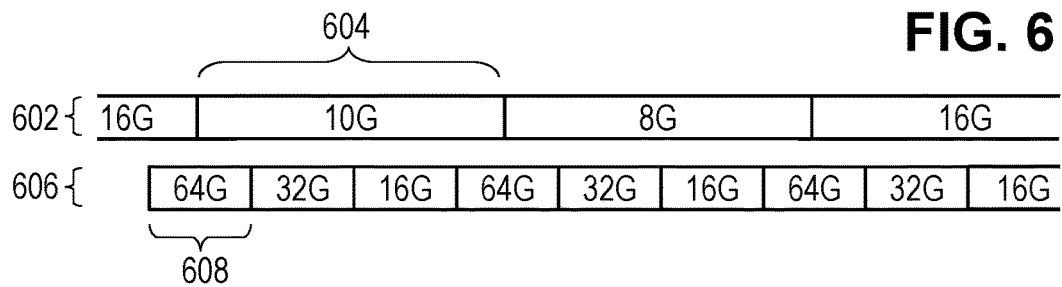
FIG. 6 is a timeline for an illustrative link speed negotiation.

As represented by line 602 of FIG. 6, the transmitter in such a host would cycle through the three supported speeds during Link Speed Negotiation, sustaining each for a predetermined interval 604, which is about 154 ms but allows for a millisecond of transition time between different speeds during which the link may be quiet or unstable. This host can notify its local pluggable module of the speed changes via the I2C/MDIO bus, so that the receiver can configure its equalizer as needed. However, the standard provides no sideband signals for the local pluggable module to similarly warn the remote pluggable module.

In spite of this circumstance, the cable should enable communication from this host to a pluggable module in a remote host that supports, for example, "64GFC", "32GFC", and "16GFC". 64GFC uses PAM4 signaling with a 256b257b line code at a line rate of 28.9 gigabaud to provide a nominal throughput of 6400 megabytes per second. (Note, however, that 64GFC uses NRZ signaling for the Link Speed Negotiation.) 32GFC uses NRZ signaling with a 256b257b line code at 28.05 gigabaud to provide a nominal 3200 megabytes per second. As represented by line 606 of FIG. 6, the receivers of the remote pluggable module and host cycle through each of the supported speeds, attempting to receive each for a predetermined interval 608 which is about ⅓ the transmit interval 604.

Figure 7A:
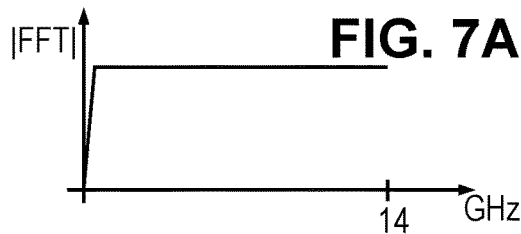
FIGS. 7A-7C are graphs of illustrative spectra for signals having different baud rates.
Figure 7B:
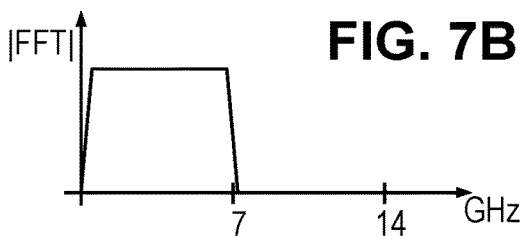
Figure 7C:
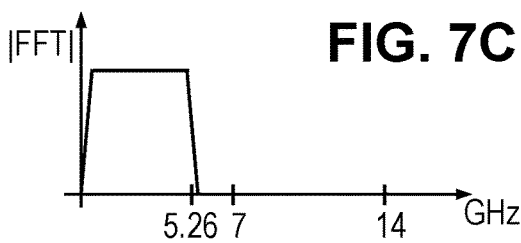

FIGS. 7A-7C compare the spectral content of the different speeds. 64GFC and 32GFC each use line rates above 28 gigabaud, and are expected to exhibit spectra such as that shown in FIG. 7A, being essentially flat from just above zero to their Nyquist frequency just above 14 GHz. (The channel may attenuate the higher frequencies somewhat, but there should nevertheless be substantial signal energy at the Nyquist frequency.)

In contrast, FIG. 7B shows the expected signal spectrum for 16GFC signaling, which uses a line rate of 14.025 gigabaud. Here the signal energy drops to insignificance above the Nyquist frequency of 7.013 GHz. FIG. 7C shows the expected signal spectrum for 10GFC, which uses a line rate of 10.51875 gigabaud. Here the signal energy drops to insignificance above 5.26 GHz.

The lack of signal energy at higher frequencies may prevent adaptive equalization methods from performing properly, and indeed may cause the adapted coefficient values to diverge to a point that makes solution convergence infeasible. It is desirable to disable coefficient adaptation where insufficient signal energy exists at high frequencies, and where the equalizer supports oversampling, it may further be desirable to disable frequency tracking for signals at lower speeds.

Stated differently, signal spectra offer one way for the receiver (or more specifically, the training controller or embedded controller) to determine the baud rate. If significant signal energy is present at 14 GHz, either when compared to a predetermined threshold or compared to a predetermined fraction of low frequency signal energy, the receiver may determine that the baud rate is 28 gigabaud (or higher). If significant signal energy is present at 7 GHz but not at 14 GHz, the receiver may determine that the baud rate is 14 gigabaud. If no significant energy is present at 7 GHz, the receiver may determine that the baud rate is 10.5 gigabaud or lower.

The receiver may periodically determine the signal energy of the receive signal at these or similar frequencies and enable adaptation and frequency tracking where signal energy is present at the higher frequencies (e.g., at 14 GHz), and inhibit adaptation and frequency tracking if signal energy is determined to be insignificant at the higher frequencies. Thus baud rate detection can be implemented by firmware or application specific integrated circuitry of the training controller 401 or embedded controller 228. In some implementations, the adaptation of certain filter coefficients may be inhibited while other coefficients may be permitted to continue adapting, e.g., adaptive gain control may be continuously enabled.

Figure 8:
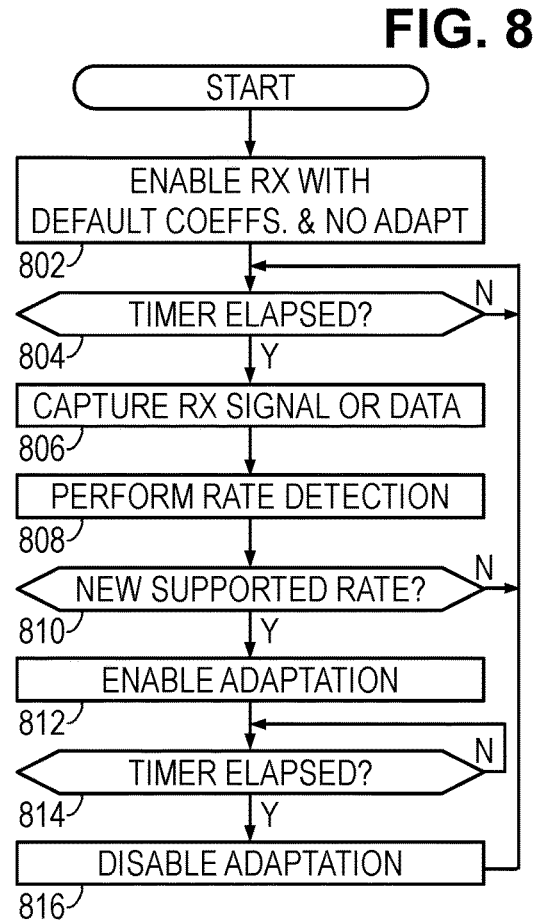
FIG. 8 is a flow diagram of an illustrative equalizer training method.

FIG. 8 is a flow diagram of an illustrative digital communications method which may be implemented in a Fibre Channel transceiver. In block 802, the controller enables the receiver using default initial coefficients, with adaptation disabled. In at least some implementations, frequency tracking is also disabled in the digital timing loop. The receiver begins digitizing the analog receive signal during a Link Speed Negotiation phase of establishing the link. The digitized receive signal is equalized and converted to symbol decisions in the usual fashion. The transceiver may attempt frame synchronization, error correction, buffering, and retransmission to the host, cycling through the supported speed parameters in the digital domain at intervals described above with respect to FIG. 6. Where such operations are unsuccessful, the transceiver may simply convert the stream of symbol decisions, or alternatively the digital receive signal, into analog form for retransmission.

In block 804, further action is delayed until a timer has elapsed. The timer may be, e.g., 10 milliseconds. Once the timer elapses, the controller captures a segment of the digital receive signal, or in alternative implementations, captures a segment of the symbol decision stream in block 806. In block 808, the controller processes the captured data to perform baud rate detection. For example, the controller may perform a fast Fourier Transform (FFT) of the captured digital receive signal to determine whether the magnitude of the frequency transform coefficient at 7 and/or 14 GHz exceeds a predetermined threshold, or exceeds a predetermined fraction (say, 20%) of the magnitude of transform coefficients at one or more low frequencies. While a full FFT can be used, some implementations may perform "single-point" FFT's to calculate only the desired transform coefficients. The low frequency signal energy may be represented by coefficients corresponding to, or below, the lowest baud rate that may be employed by a Fibre Channel transceiver with which the current transceiver can communicate, e.g., ¼ the lowest baud rate supported by the current transceiver.

As another baud-rate detection example, the controller may search the captured symbol decisions for high-frequency patterns (e.g., {1,0,1} or {0,1,0}), as signals having baud rates lower than half the symbol clock rate should mostly exhibit duplicated or multiply-replicated symbols. The presence of a significant number (greater than, say eight such patterns in a 128 symbol window) may be taken as indicating a baud rate above 28 GHz (64GFC or 32GHC speed).

In block 810, the controller may determine whether the detected baud rate is different than a previously-detected baud rate, indicating that the transmitter has recently transitioned to this baud rate. If not, or if the baud rate lacks the high frequency content desired for adaptation, the controller returns to block 804. Otherwise, the controller enables adaptation of the equalizer coefficients in block 812 (and, in certain implementations, enables frequency tracking to improve synchronization of the symbol clock to the receive signal). While adaptation is enabled, the receiver continues operating as before, equalizing the receive signal and detecting symbols, attempting frame synchronization, error correction, and buffering, and retransmitting the data to the host. The receiver cycles through the line codes and other parameters of the supported speeds during the intervals described previously with respect to FIG. 6. Block 814 enables the adaption to continue until a second timer has elapsed. The second timer may be significantly longer than the first, say 120 milliseconds.

Once the timer elapses, the controller disables adaptation in block 816 and returns to block 804. The process repeats until the receiver is able to achieve frame synchronization and determine that the error rate is acceptably low (or that some other performance metric is satisfied), at which point the reverse-direction transmitter indicates that the current rate is supported and may be used after completion of the link speed negotiation. Once both sides of the link have determined the highest speed supported by both, the Link Speed Negotiation is completed. For 64GFC, the Link Speed Negotiation is followed by a transmit equalizer training phase to optimize PAM4 symbol detection before the data transfer phase begins. For other speeds, the data transfer phase may begin immediately after completion of the Link Speed Negotiation.

Thus, in a receiver that supports 64GFC, 32GFC, and 16GFC, adaptation of the FFE and FBF coefficients may be enabled if the receive signal baud rate is 14 gigabaud or higher, and disabled if the receive signal baud rate is lower, thereby avoiding "training" of the coefficient values in situations where divergence may occur. For lower, unsupported speeds, the receiver may optionally oversample the receive signal, cooperating with a transmitter to emulate an analog repeater, digitizing, filtering, and retransmitting the signal with or without implementing symbol detection.

Numerous alternative forms, equivalents, and modifications will become apparent to those skilled in the art once the above disclosure is fully appreciated. It is intended that the claims be interpreted to embrace all such alternative forms, equivalents, and modifications that are encompassed in the scope of the appended claims.

What is claimed is:

1. A digital communications method that comprises:
    filtering a receive signal to provide a filtered receive signal;
    deriving symbol decisions from the filtered receive signal;
    detecting a baud rate of the receive signal, the baud rate being a parameter that is independent of any filter coefficients used to filter the receive signal;
    adapting one or more of the filter coefficients if the baud rate is above a predetermined rate; and
    inhibiting adaptation of at least one of said one or more filter coefficients if the baud rate is below the predetermined rate.

2. The digital communications method of claim 1, wherein said detecting includes:
    digitizing the receive signal;
    periodically calculating a frequency transform coefficient corresponding to the predetermined rate; and
    determining whether a magnitude of the frequency transform coefficient exceeds a predetermined magnitude.

3. The digital communications method of claim 1, wherein said detecting includes:
    digitizing the receive signal;
    periodically calculating a first frequency transform coefficient corresponding to the predetermined rate and at least one frequency transform coefficient corresponding to a lower rate; and
    determining whether a magnitude of the first frequency transform coefficient relative to the at least one frequency transform coefficient exceeds a predetermined threshold.

4. The digital communications method of claim 1, wherein said detecting includes:
    periodically capturing a sequence of symbol decisions; and
    determining whether the sequence includes any patterns of alternating symbols.

5. The digital communications method of claim 1, wherein said detecting includes continuously monitoring the symbol decisions for sequences of alternating symbols.

6. The digital communications method of claim 1, wherein said detecting is performed during a Link Speed Negotiation stage of a Fibre Channel initiation process.

7. The digital communications method of claim 1, further comprising:
    using a timing loop to match a symbol clock signal to the receive signal, the timing loop enabling frequency tracking and phase tracking; and
    inhibiting frequency tracking if the baud rate is below the predetermined rate.

8. The digital communications method of claim 1, further comprising, regardless of the detected baud rate:
    generating a symbol clock signal at a frequency near a highest supported baud rate; and
    using the symbol clock signal to convert the symbol decisions into a retransmitted signal.

9. A receiver that comprises:
a filter to convert a receive signal into a filtered receive signal;
a decision element coupled to the filter to derive symbol decisions;
a baud rate detector to detect a baud rate of the receive signal, the baud rate being a parameter that is independent of any coefficients of the filter; and
an adaptation module to adapt one or more of the filter coefficients if the baud rate is above a predetermined rate, the baud rate detector inhibiting adaptation of at least one of the one or more filter coefficients if the baud rate is below the predetermined rate.

10. The receiver of claim 9, further comprising:
an analog to digital converter to digitize the receive signal,
wherein the baud rate detector is configured to periodically calculate a frequency transform coefficient corresponding to the predetermined rate and to determine whether a magnitude of the frequency transform coefficient exceeds a predetermined magnitude.

11. The receiver of claim 9, further comprising:
an analog to digital converter to digitize the receive signal,
wherein the baud rate detector is configured to periodically calculate a first frequency transform coefficient corresponding to the predetermined rate and at least one frequency transform coefficient corresponding to a lower rate, and to determine whether a magnitude of the first frequency transform coefficient relative to the at least one frequency transform coefficient exceeds a predetermined threshold.

12. The receiver of claim 9, further comprising:
a memory to periodically capture a sequence of symbol decisions,
wherein the baud rate detector is configured to determine whether the sequence includes any patterns of alternating symbols.

13. The receiver of claim 9, wherein the baud rate detector is configured to continuously monitor the symbol decisions for sequences of alternating symbols.

14. The receiver of claim 9, wherein the baud rate detector is configured to operate only during a Link Speed Negotiation stage of a Fibre Channel initiation process.

15. The receiver of claim 9, further comprising:
a timing recovery loop to match a symbol clock signal to the receive signal, the timing loop configured to provide frequency tracking and phase tracking,
wherein the baud rate detector inhibits the frequency tracking if the baud rate is below the predetermined rate.

16. A data recovery and remodulation device that comprises:
a receiver to recover a data stream from a receive signal; and
a transmitter coupled to the receiver to retransmit the data stream,
the receiver comprising:
an adaptive equalizer that uses one or more filter coefficients to convert the receive signal into an equalized signal;
a decision element that derives symbol decisions from the equalized signal;
a baud rate detector that detects a baud rate of the receive signal and inhibits adaptation of the one or more filter coefficients while the baud rate is below a predetermined rate,
wherein the baud rate is a parameter independent of the one or more filter coefficients.

17. The data recovery and remodulation device of claim 16, further comprising:
an analog to digital converter to digitize the receive signal,
wherein the baud rate detector is configured to periodically calculate a frequency transform coefficient corresponding to the predetermined rate and to determine whether a magnitude of the frequency transform coefficient exceeds a predetermined magnitude.

18. The data recovery and remodulation device of claim 16, further comprising:
a memory to periodically capture a sequence of symbol decisions,
wherein the baud rate detector determines whether the sequence includes any patterns of alternating symbols.

19. The data recovery and remodulation device of claim 16, wherein the baud rate detector continuously monitors the symbol decisions for sequences of alternating symbols.

20. The data recovery and remodulation device of claim 16, wherein the baud rate detector operates only during a Link Speed Negotiation stage of a Fibre Channel initiation process.

21. The data recovery and remodulation device of claim 16, further comprising:
a timing recovery loop that matches a symbol clock signal to the receive signal, the timing loop configured to provide frequency tracking and phase tracking,
wherein the baud rate detector inhibits the frequency tracking if the baud rate is below the predetermined rate.

22. The data recovery and remodulation device of claim 16, further comprising:
a symbol clock signal generator that generates a symbol clock at a highest supported baud rate regardless of the detected baud rate,
wherein the transmitter uses the symbol clock signal to retransmit the data stream.

* * * * *